(12) United States Patent
Laor (10) Patent No.: US 6,236,481 B1
(45) Date of Patent: May 22, 2001

(54) METHOD AND APPARATUS FOR PROVIDING LOSS EQUALIZATION AND ADJUSTMENT IN A FIBER OPTIC NETWORK

(75) Inventor: Herzel Laor, Boulder, CO (US)

(73) Assignee: Astarte Fiber Networks, Inc., Boulder, CO (US)

( * ) Notice: Subject to any disclaimer, the term of this patent is extended or adjusted under 35 U.S.C. 154(b) by 0 days.

(21) Appl. No.: 09/328,534

(22) Filed: Jun. 9, 1999

(51) Int. Cl.[7] ................................................. H04J 14/02
(52) U.S. Cl. ............................ 359/124; 359/110; 359/128; 359/161
(58) Field of Search ..................................... 359/110, 117, 359/124, 128, 161, 173

(56) References Cited

U.S. PATENT DOCUMENTS

| | | | |
|---|---|---|---|
| 5,128,800 | 7/1992 | Zirngibl | 359/341 |
| 5,276,543 | 1/1994 | Olshansky | 359/124 |
| 5,436,760 | 7/1995 | Nakabayashi | 359/341 |
| 5,463,487 | 10/1995 | Epworth | 359/124 |
| 5,572,350 | 11/1996 | Spanke | 359/140 |
| 5,710,846 | 1/1998 | Wayman et al. | 385/17 |
| 5,790,285 | * 8/1998 | Mock | 359/110 |
| 6,040,933 | * 3/2000 | Khaleghi et al. | 359/124 |
| 6,091,538 | * 7/2000 | Takeda et al. | 359/124 |

\* cited by examiner

*Primary Examiner*—Kinfe-Michael Negash
(74) *Attorney, Agent, or Firm*—Venable; James R. Burdett (57) ABSTRACT

Loss equalization is provided in an optical communications network. Included in a optical communications network are a number of optical switches which include various elements for the routing of optical signals. The optical paths through the switches may introduce loss into the signals which causes the strengths of the various signals transmitted over the plurality of lines to be different. Measurements of the optical signals may be taken at both the entry and the exit of the optical switch. Through this measurement, losses through the paths are measured. This information may then be used to adjust the routing devices within the optical switch to equalize the losses occurring along the paths. Measurements may also be taken at various points in the optical network to determine losses introduced by components such as splices or amplifiers. Equalization for these losses can also be made through the routing devices of the optical switch.

18 Claims, 5 Drawing Sheets

METHOD AND APPARATUS FOR PROVIDING LOSS EQUALIZATION AND ADJUSTMENT IN A FIBER OPTIC NETWORK

FIELD OF THE INVENTION

The present invention relates to optical signal communications networks, and more particularly to providing loss equalization or adjustments for optical signals transmitted through the network.

BACKGROUND OF THE INVENTION

Fiber optic systems are now commonly used for transmitting optical communication signals, i.e., optical signals modulated to encode desired information. The optical communication signals are transmitted across a network using optical fibers that support substantial transmission capacity with compact fiber bundles. Given the ever-increasing demands for improved signal quality and bandwidth, it is anticipated that use of fiber optic communications will continue to increase for years to come.

One of the reasons that fiber optic networks have attracted attention in recent years relates to switching advantages. Because the communication signals in fiber optic networks are optical in nature, conventional electronic switching components can be eliminated. Instead, fiber optic communications lines are connected at a switch by carefully aligning the fiber ends of the lines to be connected for direct optical linkage. Such switching has proved advantageous in that switching can be accomplished quickly.

Between the switches, various lengths of fiber optic line carry the optical signals. The lengths of fiber optic line are connected together using splices or connectors. The lengths of fiber optic line may also include cascaded chains of optical amplifiers which act to amplify the signals in order to maintain signal strength.

In order to increase the amount of information being transmitted across a fiber optic telecommunications network, wavelength division multiplexing (WDM) has been employed. In a WDM system, each individual fiber carries signals at a number of different wavelengths. At a predetermined point in the system, the optical signal is demultiplexed and the individual signals are transmitted to unique destinations.

SUMMARY OF THE INVENTION

The inventor has recognized that when optical signals are transmitted through an optical communications network, loss may be introduced into the signals at different points in the network. The amount of loss may vary for each optical path. This variation in signal level may be unacceptable in some networks. In a WDM network, for example, the signal level entering an optical amplifier should be equal for all wavelengths, otherwise the stronger wavelength will be amplified more than the weaker wavelength. The inventor has further recognized that loss equalization for the optical signals may be performed within the optical switch itself.

The present invention describes an apparatus and method for equalizing or adjusting the loss which may be introduced due to network functions such as signal routing, amplification, as well as transmission along spliced fiber optic lines. In an optical signal communications network, an M×N switch may receive a plurality of optical signals over communications lines from a remote source. Within the switch, the signals are routed to the appropriate output lines. Different amounts of loss may be introduced depending on the optical path taken by a signal through the optical switch. In order to determined the losses along each optical path, readings may be taken at the input and output of each optical path through the switch to measure the strength of the optical signal at these two points. A comparison of these measurements may then be made to determine the losses occurring along each path.

In one aspect of the invention, the optical switch may include a number of devices for routing incoming signals to the appropriate outgoing optical line. These devices may be manipulated such that strength of signal transmitted along the various paths through the optical switch may be varied. When the losses through the switch are identified, the various devices may be employed to equalize the strengths of the optical signals.

In another aspect of the invention, each path in the optical switch may include a movable optical device such as an optical lens, prism, fiber or mirror for directing the optical signal. Translation or rotation of this optical device may be performed through use of a servo motor. Through measurements made of the incoming and outgoing signals along the incoming and outgoing lines, a determination may be made as to which routing path through the optical switch introduces the greatest loss. Once this path is identified, the appropriate servos may be employed to manipulate the optical devices such that the optical signal strength measured over the output lines are equalized. In another aspect of the invention, once the path with the maximum loss is identified, the adjustments made to the other paths introduce sufficient loss to equalize the signal strength across all the output lines.

In another aspect of the invention, the optical switch may comprise multiple cross points positioned to direct the incoming optical signals to the appropriate output lines. Measurements may be made of the optical signal magnitudes at the exit and entrance to the optical switch. Through these measurements the loss through the various optical paths may be determined. Once this determination is made, the appropriate cross points may be manipulated in order to equalize the magnitude of the optical signals exiting from the optical switch. In another aspect of the invention, the path over which the maximum loss occurs may be determined. Based on this determination, adjustments may be made to the appropriate crosspoints to introduce sufficient loss in the other paths to equalize the signal strength across all the output lines.

In another aspect of the invention, the optical switch may include a number of 1×N couplers connected to the incoming optical signal lines. Each coupler splits the incoming signal into N identical signals. The N identical signals are each routed to N×1 couplers connected to each of the outgoing lines. Between the couplers are positioned on/off optical amplifiers which are either turned on or off depending the desired routing scheme through the optical switch. The optical amplifiers which are in the on mode, may direct the optical signals to the desired output line. Measurements may be taken at the entry and exit of the optical switch in order to measure signal losses which occur over the different paths. These measured losses may then be employed to adjust the gain of the amplifiers to equalize the strength of the optical signals.

The strength of the signal entering and exiting the optical switch may be measured in an number of different ways. In one aspect of the invention, tap sensors may be positioned proximate to the signal lines at the input and output areas of the optical switch. Readings from these sensors may then be compared to determine the loss along a particular path through the switch.

Within the network, losses in the optical lines may occur at other places than the optical switches. For example, losses may be introduced at splices or connectors which connect communications lines together. Yet another source of variation may be the optical amplifiers positioned along the communication lines to maintain signal strength. In a system which employs WDM, these amplifier may provide different gain for different wave-lengths transmitted along the communications lines.

In another aspect of the invention, the optical signal strength may be measured at the source of the optical signals, i.e., the optical transmitter, and measured at the destination of the optical signal (i.e., optical receiver). Once the two measurements are made, they may be compared in order to determine losses which occur along a particular path through the network. Once this information is determined, it may be used with regards to the optical switch to equalize the optical signals through manipulation of the routing mechanisms contained therein.

Equalization of signals may be performed in a number of different ways. Before the system goes into normal operation, test signals may be transmitted and measured, and based on the measured losses the optical pathways may be manually adjusted to equalize the losses. In another aspect of the invention, measurements may be made of the optical signal during operation of the fiber optic communications system, and these signal magnitude may be fed back to at least one processor. The processor may then determine the losses over the pathways, and then provide automated adjustments of components in the switch in order to equalize the signals.

Numerous modifications and additions will be apparent to those skilled in the art upon further consideration of the invention.

DETAILED DESCRIPTION

Figure 1:
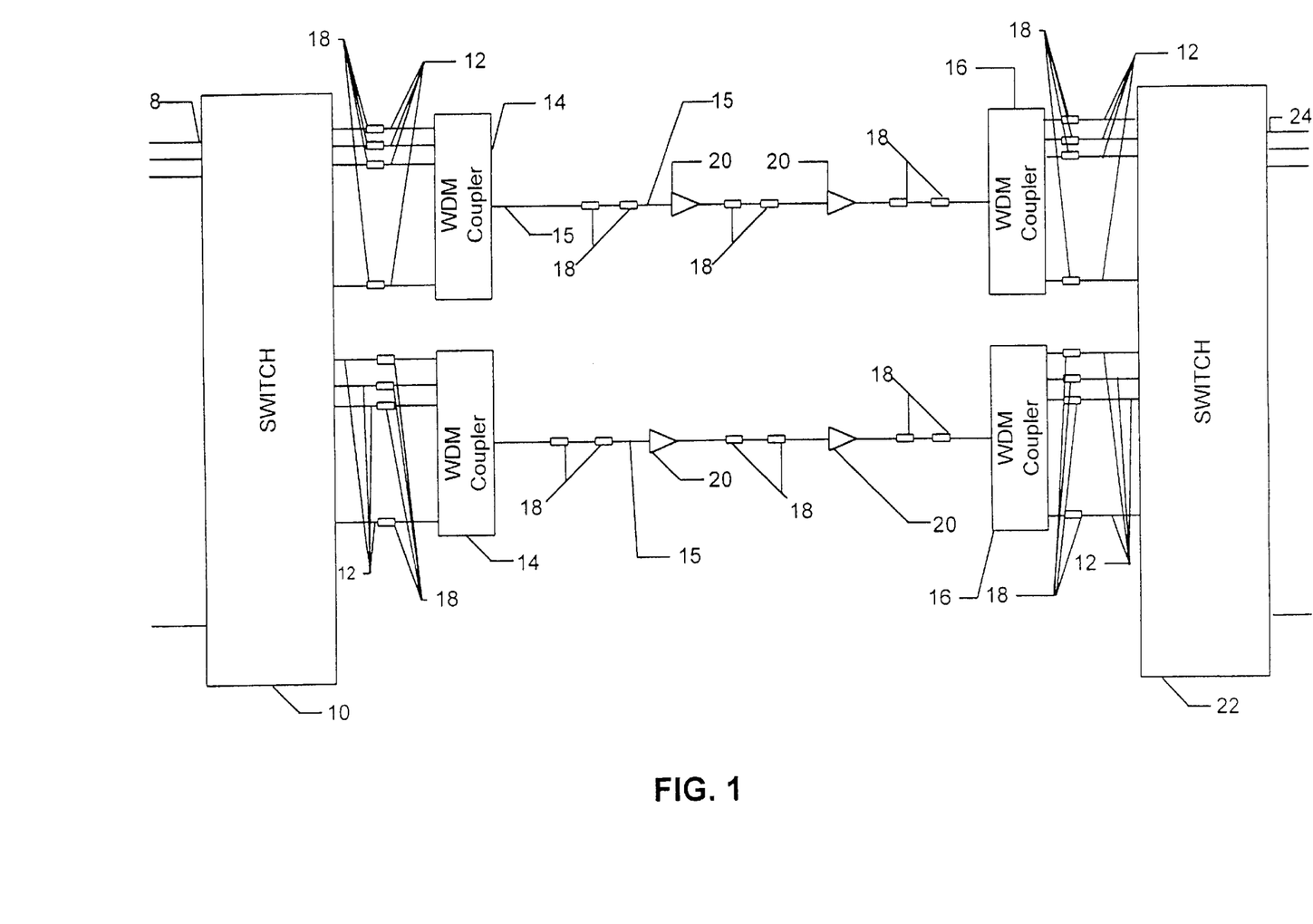
FIG. 1 discloses a portion of a fiber optic communications network.

Disclosed in FIG. 1 is a portion of a fiber optics communications network. The network provides for the routing of encoded optical signals to desired destinations. Optical communication signals which are transmitted from a remote site are carried over optical signal communications lines 8 to optical switch 10. The optical switch 10 provides the functionality to route the incoming signals. The internal configuration of the optical switch is described in detail below. Exiting from the optical switch 10 are a number of output lines 12 which carry the optical signals.

In the communications system shown in FIG. 1, the signals which exit from the optical switch are input to a wave division multiplexer (WDM). The WDM multiplexes the incoming signals into a single outgoing signal which is transmitted over fiber optic cable 15. In a network which doesn't employ a WDM, the output lines may carry the signals to the desired location or another optical switch.

Along the fiber optic line 15 are a number of splices or connectors 18, and optical amplifiers 20. The distance between the WDM 14 and the WDM 16 may be great and the amplifiers 20 act to maintain the signal strength over this distance. At the other end of the fiber optic line 15 from the WDM 14, is the demultiplexer 16. This demultiplexer is employed to identify the different wavelengths which have been incorporated into a single signal and separate them out for further transmission within the network. These demultiplexed signals are routed to the second optical switch 22. Various routing functionality is included within the optical switch 22 which routes the received optical signals over optical lines 24 to their destination.

All fiber optic communications network exhibit some variations in optical loss performance. This loss may appear in the optical switches or within the various connectors and amplifiers positioned along the fiber optic lines. These losses may occur because of slight misalignments in splices or connectors, or gain differences for different wavelengths within a signal for each amplifier.

Within the optical switch, the components which route the optical signals may through misalignment or other inconsistencies introduce varying levels of loss in the optical signals. Light entering an optical M×N switch emerges after being routed to the required output with loss (in some switches, gain) which may be different for each route taken. This variation signal level may be unacceptable in some networks. For example, in a WDM transmission, the signal level entering an optical amplifier should be equal for all wavelengths, otherwise the stronger wavelength will be amplified more than the weaker wavelength.

Figure 2:
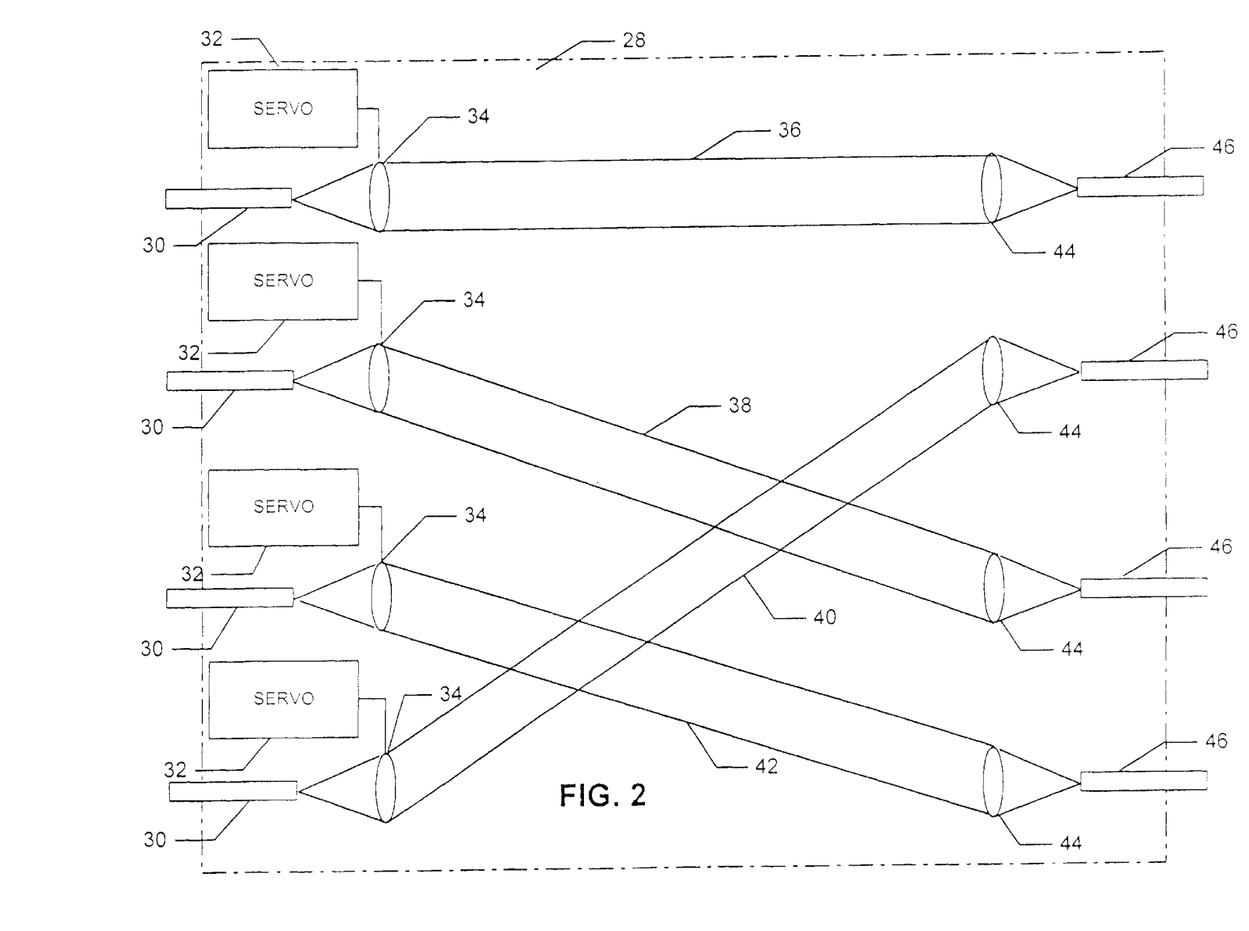
FIG. 2 discloses an optical switch which includes servo actuated directional controllers.

FIG. 2 discloses one embodiment of an optical switch which routes optical signals received from a variety of lines to the appropriate output line. Signals are received on input lines 30 and are transmitted through the input optical lenses 34. This directional lens is aligned such that it directs incoming light signal along the appropriate path to the output optical lines 46. Located proximate to the outgoing optical lines are output optical lenses 44. These lenses receive the optical signal which had been routed by incoming optical lenses 34 and focus it onto lines 46.

Connected to the input optical lenses 34 are servo motors 32. These servo motors are employed to rotate or translate the optical lenses 34 so that the incoming optical signals received over lines 30 are directed towards the appropriate output line. In the example shown in FIG. 2, it is seen that the optical signals are routed along paths 36, 38, 40, and 42 through the optical switch. In addition to rotating or moving the optical lenses, beam direction may be achieved by moving the fibers, mirrors, prisms and/or other means.

Optical signal loss may be introduced into the optical signals along these paths by such things as lens misalignments or other aberrations in switch components. In order to determine the loss introduced in the various paths through the optical switch, measurements of the optical signals carried over the individual lines may be taken at the exit and entrance to the optical switch. The apparatus for measuring these values will be described in greater detail below. Through the measurements taken, the losses over each path through the optical switch may be determined. This loss information may then be used to make adjustments within the optical switch.

In the embodiment of the invention shown in FIG. 2, the servos 32 for each of the incoming optical lenses may be employed to rotate or translate the lens so as to change direction of the optical signal. Based on the measured losses over the paths through the optical switch, the servos may be directed to vary the path of the signals so as to equalize signal strength. For example, if measurements are taken at the input and output of switch 28 in FIG. 2, the two measurements for each path are compared to determine the actual loss over a particular path. All the measured losses may then be compared to determine which path has the greatest. If the greatest loss occurred over path 42, the lenses in paths 36, 38, and 40 may be adjusted to equalize the losses. Equalization includes degrading the performance of the paths to the point that they are all equal. The servo mechanisms are individually controllable, and as such, unique adjustments may be added to each path such that the appropriate error is introduced into the signal.

Figure 3:
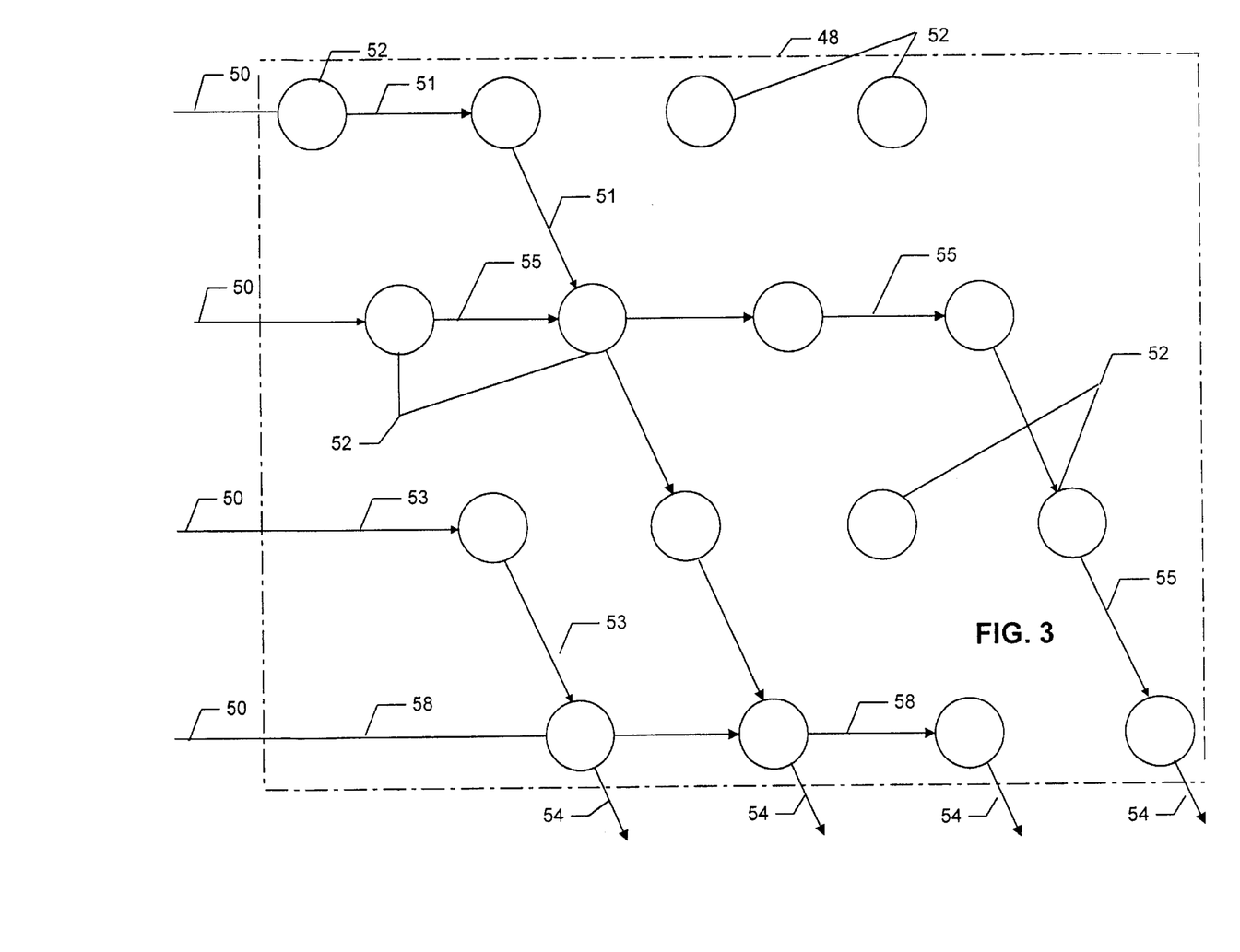
FIG. 3 discloses an optical switch which includes a number of cross points for changing signal direction.

Disclosed in FIG. 3 is a second embodiment of an optical switch. Incoming signals are transmitted over optical lines 50 and once within the optical switch, encounter the cross points 52. The optical cross points are directional devices which either allow light to pass, or may be adjusted so as to direct the incoming light signals to the appropriate outgoing optical lines 54. The cross points may be made from mechanical 2×2 switches, guided wave thermo-optic switches, electro optic switches, etc. The plurality of cross points are each aligned to direct signals received over the incoming lines 50 to one or more outgoing lines 54.

The number of cross points included in a particular optical switch is directly related to the number of incoming and outgoing signal lines. The cross-points arrangement disclosed in FIG. 3 is just one of numerous possible arrangements of 2×2, 1×2, 1×N, etc. crosspoints. The light signals pass through a number of the cross points within the optical switch, and each cross point provides the opportunity to introduce a loss into the optical signal. The greater number of cross points that a signal passes through, the greater the amount of loss which may be introduced. As mentioned above, the cross points are adjustable such that their alignment relative to the incoming and outgoing signals may be changed.

Figure 4:
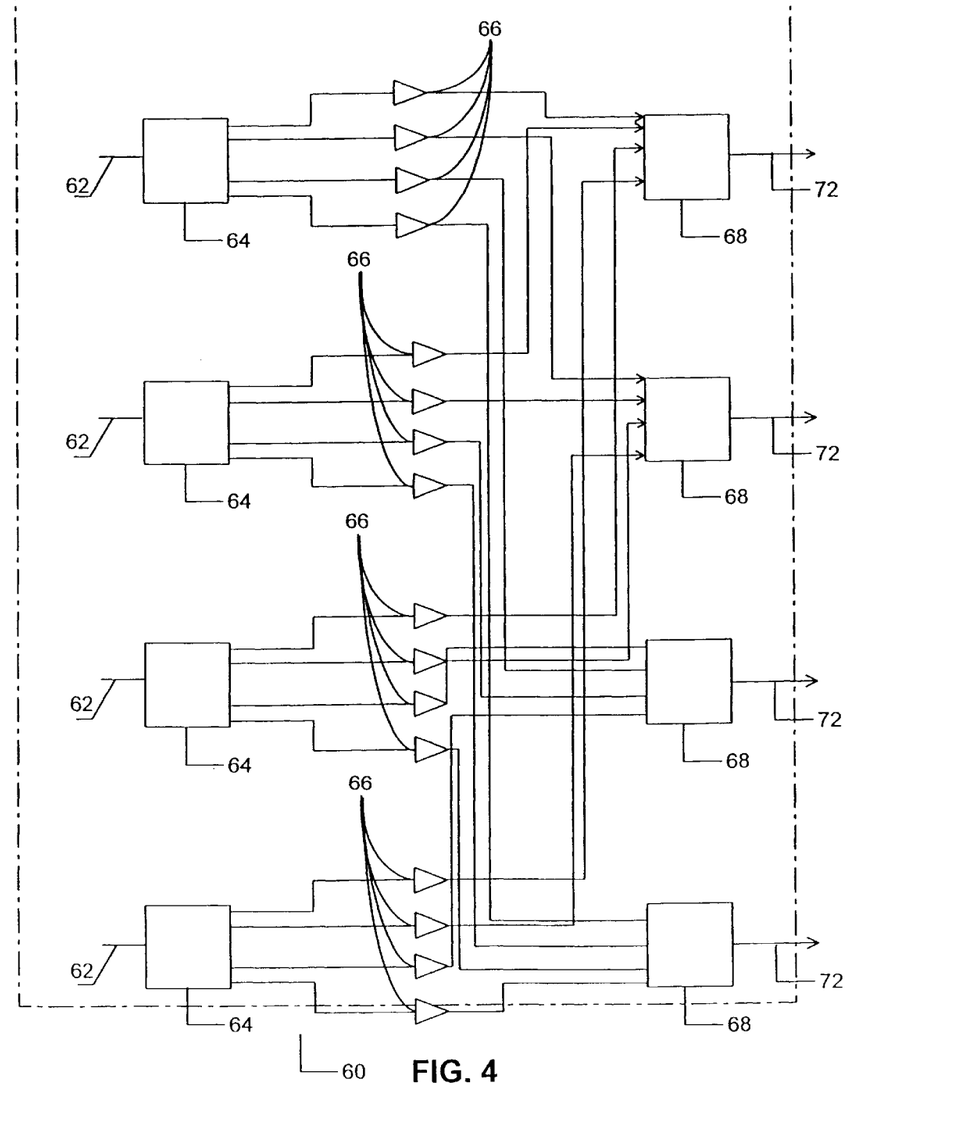
FIG. 4 discloses an optical switch which includes a plurality of on/off amplifiers for routing optical signals through the switch.

As with the optical switch of FIG. 2, measurements are made on the incoming and outgoing lines of the optical switch 48 to determine how much loss is introduced into each of the paths through the optical switch. Once the measurements are made, adjustments may be made to the cross points to equalize the optical signals received at the output lines. For example, the switch 48 in FIG. 3 includes optical paths 51, 53, 55, and 58. If the greatest loss is measured in path 53, the cross points in paths 51, 55, and 58 may be adjusted to equalize the signal strength over all the paths. Disclosed in FIG. 4 is a third embodiment of the optical switch 60. Incoming signals are received over optical lines 62. Once in the optical switch, each signal is split into a plurality of separate signals by the 1×N coupler 64. The separate signals may then be amplified by on/off optical amplifiers 66. A connection is established, through an on/off amplifier, from each input line to each output line. If a particular amplifier is in the on state, it amplifies the optical signal received from the 1×N coupler and further directs it to the appropriate output coupler 68 and into output line 72. If the amplifier is in the off state, no signal is allowed to pass. Through this scheme, the on/off amplifiers act to route the optical signals through the optical switch to the appropriate output line.

As with the embodiments described in FIG. 1 and FIG. 2, a number of components within the optical switch 60 may introduce losses to the optical signals. Further, measurements are also made of the signal strength in the transmission lines at both the entrance and exits of the optical switch 60. Once these measurements are made, a determination is made over which paths through the optical switch the greatest optical losses are occurring. Once this information is known, the gain of the amplifiers may be adjusted up or down to equalize the optical signals routed through the optical switch. The amplifiers included therein provide the functionality to adjusted the gain.

Figure 5:
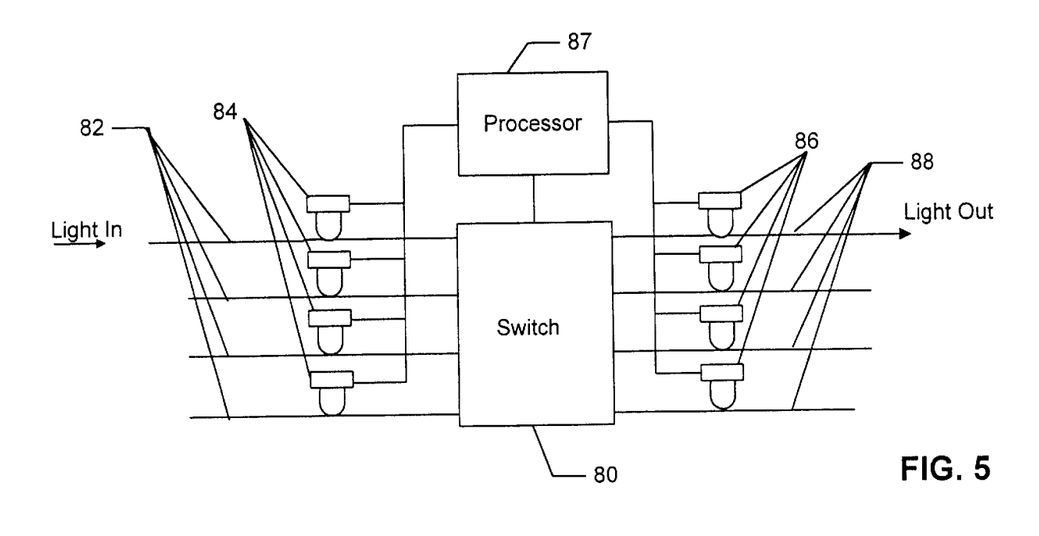
FIG. 5 discloses the optical sensors employed for measuring optical signal strength on either side of the optical switch.

As was mentioned above, the signal magnitudes are measured at both the entrance and exits of the optical switches. Disclosed in FIG. 5 is one embodiment for making those measurements. The incoming optical signals are received over optical lines 82. Signals routed from the optical switch are directed over optical lines 88. Positioned proximate to both the incoming and outgoing optical lines are optical tap sensors 84 and 86 which measure the magnitude of the optical signal within the transmission line. In order to make these measurements, the incoming lines 82 and the outgoing lines 88 are tapped by bending the line proximate to the optical sensor 84 and 86, or by inserting a coupler with a low coupling ratio, which may direct a portion of the optical signal to sensors 84 and 86.

The sensors 84 measure the magnitude of the optical signals in the incoming lines, and the tap sensors 86 measure the magnitude of the optical signals on each of the outgoing lines. One skilled in the art would know that a number of sensors may be employed with regards to these incoming and outgoing lines in order to measure the magnitude of the optical signals transmitted therein. Once this information has been gathered, an analysis may be performed to determine signal loss on a per transmission path basis. Once this is known, the appropriate adjustments may be made to the components within the optical switch to provide the necessary loss equalization as was described above.

The adjustments to the optical pathways may be performed in a number of ways. Firstly, test signals may be transmitted through the system prior to operation, and then based on measurements taken at the tap sensors, adjustment may be made to the optical pathways through the switch. In the embodiment shown in FIG. 5, the adjustments may be made to the optical pathways during regular operation of the system. Measurements made frequently at the tap sensors 84 and 86 are fed back to processor 87. Processor 87 then determines the losses which occur over each of the pathways. Once this determination is made, control signals may be transmitted to the pathway control devices in switch 80, so that the necessary adjustments may be performed. This feedback system may also be employed with regards to measurements take over an entire network as will be discussed in detail below.

As was mentioned above, losses in the optical communications network may occur at other points in the systems besides within the optical switches. Referring again to FIG. 1, it is seen that there are a number of components included between the optical switches. These include the WDM couplers 10 and 22, line splices or connectors 18, and the amplifiers 20. In particular, it should be noted that the optical fiber splices may not be very equal in loss performance and the optical amplifiers may provide different gain for different wave lengths. In order to determine exactly how much loss is introduced by the various components in the entire system, it may be necessary to make measurements of the optical signals at the point where they are generated, as well as the point where they are received and further processed.

Figure 6:
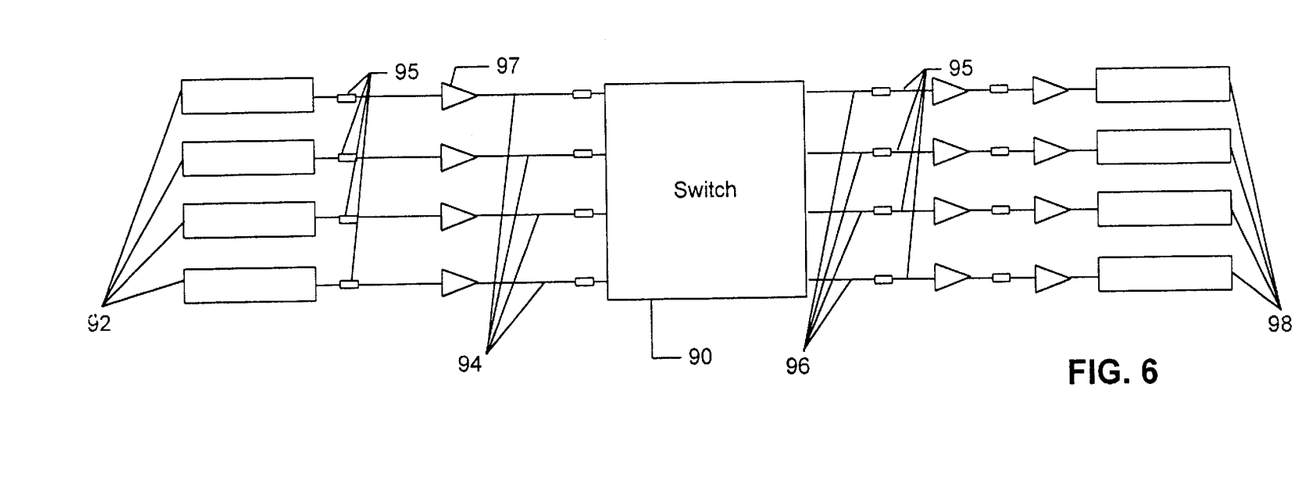
FIG. 6 discloses optical transmitters and optical receivers in connection with the optical lines and optical switches of the optical signal communications network.

FIG. 6 discloses a simplified diagram of an optical communications system which includes many of the same components as shown in FIG. 1. Included in the system are optical signal transmitters 92 which encodes and transmits optical signs over lines 94. The transmission line may be of the length required to build a optical communications network may include multiple splices 95 as well as amplifiers 97. In order to route the transmitted information to the desired destination, an optical switch 90 receives the signals over optical lines 94, reroutes and transmits the signals over the optical lines 96. Optical lines 96 also include various connectors, splices, and amplifiers. A complex network with several optical switches in the communication path is also possible. The destination of the optical signals are the optical receivers 98. In these optical receivers, the optical signals are received and then decoded, and the information contained therein is further processed.

In order to measure losses which may occur over the optical communications network, measurements are made at both the optical transmitters 92 and the optical receivers 98 to measure the loss which occurs over each path. This determination will require knowledge of the routing configuration of the optical switch 90. Once this determination is made, the information can be provided to the optical switches, and through the various embodiments described above, the optical paths through the switch can be equalized. This equalization may include the introduction of loss in order to have all paths match the path which naturally introduces the greatest loss, or to have all paths have a certain specific loss required for proper operation of the system.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An optical communications system which provides optical signal equalization comprising:
    at least one optical signal transmitter which encodes and transmits optical signals;
    a plurality of optical lines which carry optical signals between components of the optical communications system;
    at least one optical switch in connection with the optical lines, said switch includes a plurality of optical paths which direct optical signals received from optical input lines through the optical switch to optical output lines, where each of the optical paths is individually variable such that the strength of the optical signals carried therethrough may be adjusted;
    a plurality of sensors positioned at selected points in the network to measure losses over of the optical lines; and
    at least one optical signal receiver which decodes optical signals.

2. The system of claim 1 wherein the system includes wavelength division multiplexing (WDM) means.

3. The system of claim 2 wherein the optical signals from the optical switch pass to the WDM means.

4. The system of claim 1 wherein the sensors are positioned at the input and output of the optical switch to measure the loss across the switch.

5. The system of claim 1 wherein sensors are located at the at least one optical signal receiver and the at least one optical signal transmitter to measure optical signal loss across the system.

6. The system of claim 1 further including a processor which receives the optical signal measurements from the sensors, determines the optical signal loss, and provides control signals to the optical switch in order to perform adjustments to equalize signal loss across the optical pathways.

7. The system of claim 1 wherein the optical signal is varied in the optical switch based on measured losses in the system.

8. The system of claim 7 wherein optical loss is added to the optical signals by the switch based on the greatest amount of loss measured by the sensors.

9. The system of claim 1 wherein the at least one optical switch includes a plurality optical lenses which direct the optical signals through the optical switch and on to optical output lines, where the plurality of optical lenses are movable to alter the optical paths through the at least one optical switch.

10. The system of claim 1 wherein each of the optical paths comprises a plurality of optical cross points which may change direction of the optical signals and introduce a predetermined amount of loss.

11. The system of claim 1 wherein the plurality of the optical paths comprise:
    a 1×N coupler connected to each of the input lines, where the 1×N coupler divides the incoming optical signal into N separate signals which are directed over N different optical paths through the optical switch;
    an N×1 coupler connected to each output line, where each of the N×1 couplers is in connection with at least one of the N different optical paths from each of the 1×N couplers; and.
    a variable gain on/off amplifier connected along each of the N different optical paths between the 1×N coupler and the N×1 coupler which if in the "on" state amplifies and directs the optical signal through the optical signal and if in the "off" state blocks further transmission of the optical signal.

12. A method for equalizing optical signals in an optical signal network comprising the steps of:
    measuring optical signal intensities along a plurality of optical signal paths at an input and an output for at least one component in the optical signal network;
    comparing the measured optical signal intensities along each of the plurality of optical signal paths to identify any losses which may occur along each of plurality of optical paths; and
    based on the identified losses, varying the intensity of a selected number of the optical signals passing through at least one switch in the optical network to equalize strengths of all the measured optical signals.

13. The method of claim 12 wherein the step of varying the intensity includes introducing loss into the selected number of optical signals such that the strengths of the measured optical signals are equal to the strength of a particular optical signal in the optical path through which the measured loss is the greatest.

14. The method of claim 12 wherein the step of varying the intensity is performed within the at least one optical switch by adjusting the optical paths passing therethrough.

15. The method of claim 14 wherein the step of varying the intensity is performed by degrading the optical paths.

16. The method of claim 14 wherein the measurement of optical signal intensities is performed at an input and an output of the at least one optical switch.

17. The method of claim 12 wherein the step of measuring optical signal intensities is performed at a first point in the optical signal network where optical signals are encoded and transmitted and at a second point in the optical signal network where the optical signals are received and decoded.

18. The method of claim 12 wherein the step of varying the intensity is performed prior to the optical signal being wavelength division multiplexed.

* * * * *